United States Patent

McFerrin

[11] 3,727,128
[45] Apr. 10, 1973

[54] TDR CABLE FAULT LOCATION

[76] Inventor: Michael A. McFerrin, 2334 Chart Drive, Dallas, Tex. 75228

[22] Filed: Aug. 9, 1971

[21] Appl. No.: 170,315

Related U.S. Application Data

[63] Continuation-in-part of Ser. No. 77,126, Oct. 1, 1970, abandoned.

[52] U.S. Cl. .................................................. 324/52
[51] Int. Cl. ............................................. G01r 31/11
[58] Field of Search ........................... 324/51, 52, 54

[56] References Cited

UNITED STATES PATENTS

| | | | |
|---|---|---|---|
| 2,707,267 | 4/1955 | Gavin | 324/52 |
| 3,421,076 | 1/1969 | Eigen | 324/54 |
| 2,651,752 | 9/1953 | Devot | 324/52 |
| 2,709,784 | 5/1955 | Spaulding | 324/52 |
| 3,517,306 | 6/1970 | Anderson et al. | 324/52 |

OTHER PUBLICATIONS

Stringfield et al. Fault Location Methods For Overhead Lines AIEE Transactions Aug. 1957 pp. 518–530

Ekuall, H. N., Fault Location on Non-Metallic Sheath Cable Electrical World, May 27, 1944 p. 108

*Primary Examiner*—Gerard R. Strecker
*Attorney*—Richards, Harris & Hubbard

[57] ABSTRACT

A fault in an insulated electrical cable of known propagation velocity is located by applying to the cable a voltage at about rated cable voltage to ionize material in the region of the fault and concurrently applying a high powered D.C. pulse having an abrupt onset to the cable at about a peak of the alternating voltage to produce reflections from the mismatch at the location of the ionized material. The time interval between application of the D.C. pulse and the return of the reflection is then measured to indicate the distance to the fault.

18 Claims, 5 Drawing Figures

INVENTOR:
MICHAEL A. McFERRIN

INVENTOR:
MICHAEL A. McFERRIN

ATTORNEYS

TDR CABLE FAULT LOCATION

This application is a continuation-in-part of a prior application, Ser. No. 77,126, filed Oct. 1, 1970 now abandoned.

THis invention relates to location of faults in an electrical cable, and more particularly to the time domain reflectometry (TDR) for locating faults on high voltage cables where the fault is characterized by establishing and maintaining ionization A.C. at the fault location during the time domain reflectometry operation.

A time domain reflectometry (TDR) has heretofore been described and attempts have been made to use such operation for location of faults in underground high voltage power cables. While the present invention is useful in many other types of cable systems, for the purpose of illustration, attention will here be directed principally to the problems involved in locating faults in high voltage underground power cables.

It will be observed that in heavily populated metropolitan areas, power systems are now more frequently being installed in conduits underground than heretofore. Underground transmission and distribution systems currently in use most generally involve a single conductor for each of the three phases. Each conductor is encased in the dielectric. In some instances, the dielectric is encased by a lead or other metallic sheath.

In earlier systems, often a single cable structure was used wherein the three conductors were each insulated from the other. High voltage transmission and distribution systems underground are subject to faulting. In metallic sheathed cables corrosion may ultimately result in a breakthrough of the sheath, followed by penetration of water, gas or other materials. When the insulation has been sufficiently compromised by whatever mechanism, the cable breaks down and high current begins to flow from the central conductor to the exterior. Safeguards on such power systems generally include breakers which will open the circuit which feeds power to the cable within two or three cycles following breakdown. By this means the switchgear protects the cable conductor and its surroundings from excessive damage. Thus, when a breaker opens to isolate a section of line from the power source, there exists at the fault location a condition which must be located and the cable must be repaired or replaced.

In underground systems where sections of the cable can be pulled from a conduit and replaced, it is necessary to know the location of the fault in order that the proper section may be dealt with. It is a difficult and time-consuming operation to replace a cable section so certainty as to the proper cable is essential.

Where power cables are buried underground in trenches, it is highly desirable to be able to pinpoint the location of the fault in order that excavation can be undertaken at the proper point to locate the fault and thereby avoid the extensive search through excavation that otherwise would be necessary.

Time domain reflectometry is known. In IEEE Conference Paper Jan. 28–Feb. 2, 1968, entitled "Time Domain Reflectometry System for Practical Fault Location on High Voltage Cables" by applicant, the use of TDR was described wherein short high voltage pulses were applied to such lines and reflections from faults therein were detected in order to locate a fault.

It has since been discovered that by reason of the protective measures employed in power systems to limit current flow when a cable breaks down, the TDR systems heretofore known are unable to detect the fault because the fault does not present a substantial impedance variation. Other impedances hooked to the line produce signals which mask or otherwise obliterate any reflection from the fault so that it cannot be detected. More particularly, conventional TDR systems apply pulses to a faulted cable and these pulses are reflected back to the source in the time domain whenever they encounter an impedance change in the cable. However, since the majority of high voltage power cable faults are cleared rapidly by fast-operating fuses or breakers, they are neither burned open nor shorted to ground. In such case, the pulses do not encounter a significant impedance mismatch. As a result, pulses are not reflected back from the fault. This is commonly termed a "high resistance fault". This is the most frequently encountered type of high voltage power cable fault.

It is an object of the present invention to overcome the foregoing limitations heretofore inherent in known TDR operations. This is accomplished through the application to the cable of a voltage substantially at the operating voltage rating of the cable and at a suitable low frequency such as the power frequency by way of a suitable current limiting device in order to establish and maintain the ionization at the fault location. Concurrently with the foregoing, a short high voltage pulse is transmitted over the cable. Reflections are produced by the ionized fault. The pulses are applied and the reflections are received in a time interval during which the power voltage is at a peak. Thus, by establishing and maintaining ionization, the impedance mismatch at the fault is large. The reflection may now, because of the control of the impedance character at the fault, be detected above the background noise.

Thus, in accordance with the present invention, a fault on an insulated electrical cable of known propagation velocity is located by applying to the cable an alternating voltage at about the rated cable voltage to ionize material in the region of failure of the insulation. A D.C. pulse is applied to the cable at about a peak of the alternating voltage to produce reflections from the discontinuity produced by ionization of the material. The time interval between application of the D.C. pulse and the return of the reflection of the pulse from the fault is then measured to indicate distance to the fault.

For a more complete understanding of the present invention and for further objects and advantages thereof, reference may now be had to the following description taken in conjunction with the accompanying drawings in which.

Figure 4:
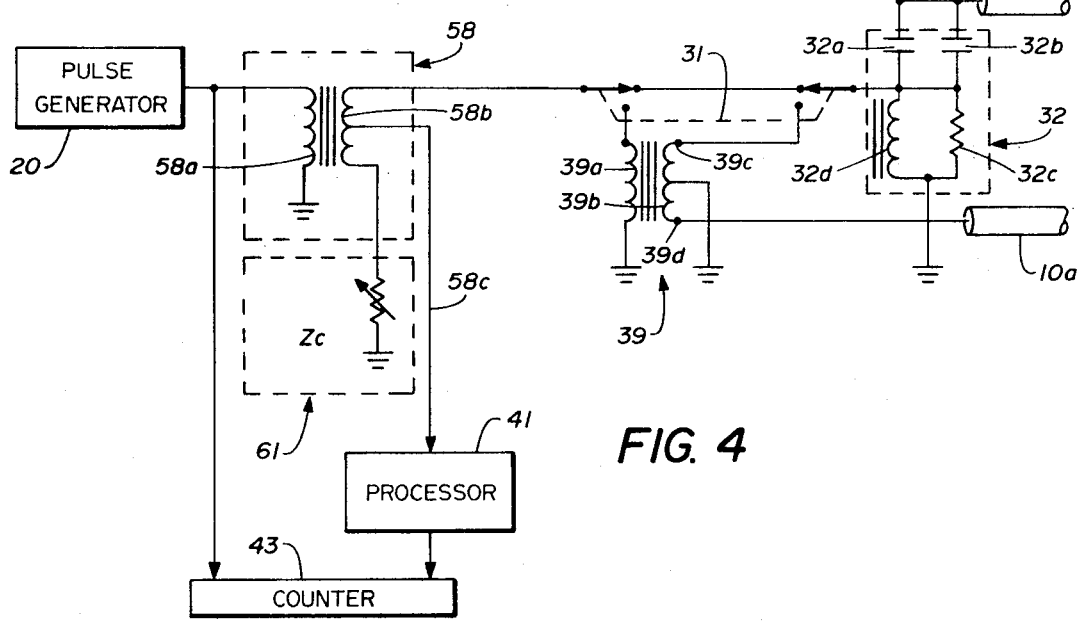
Figure 5:
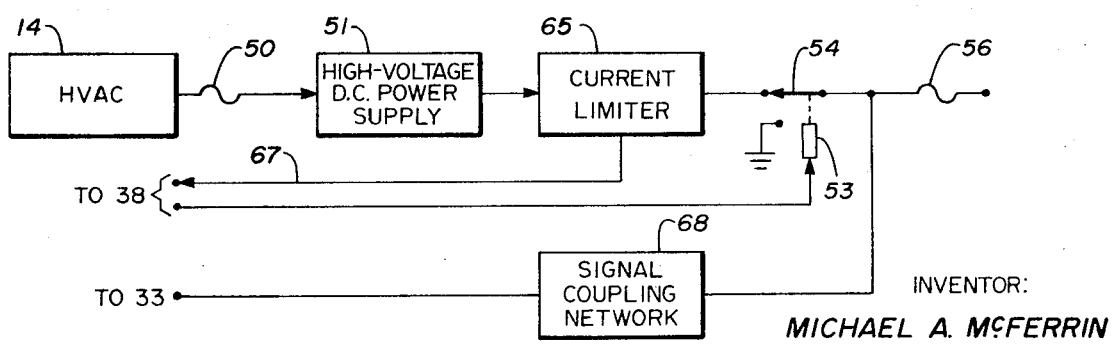
Figure 3:
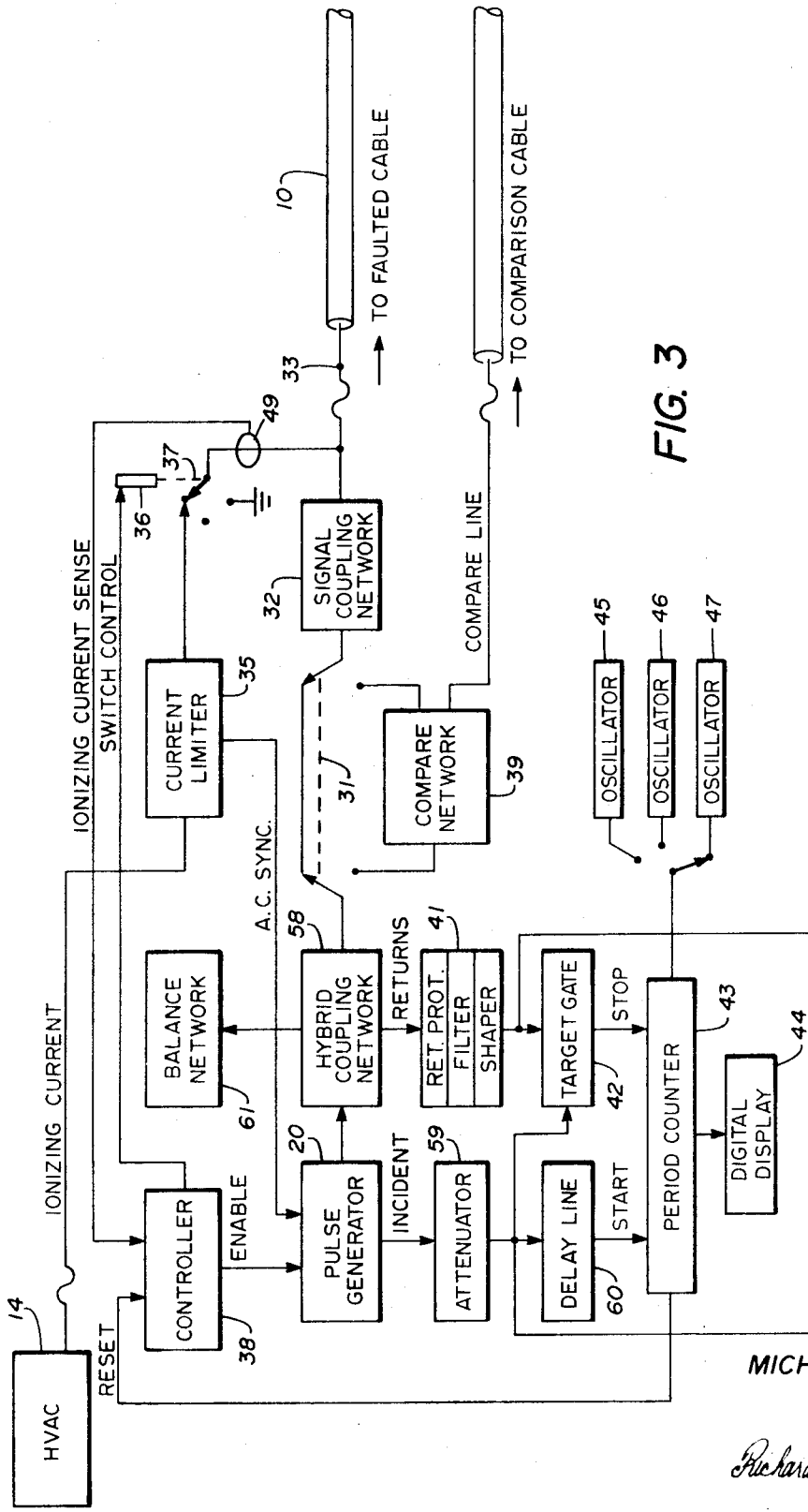
FIG. 3 is a block diagram of a fault locator embodying the present invention.

FIG. 4 illustrates one form of coupler 58 of FIG. 3 along with networks 39 and 32; and FIG. 5 illustrates a modification for use in transmission class line.

The system of the present invention is particularly suited for use with power cables, regardless of voltage class, conductor size, type of insulating dielectric, length of cable or type of installation. It may also be used to locate faults in joints, splices, terminators, transformers, switches and other devices connected to the cable that are subject to insulation failure.

Figure 1:
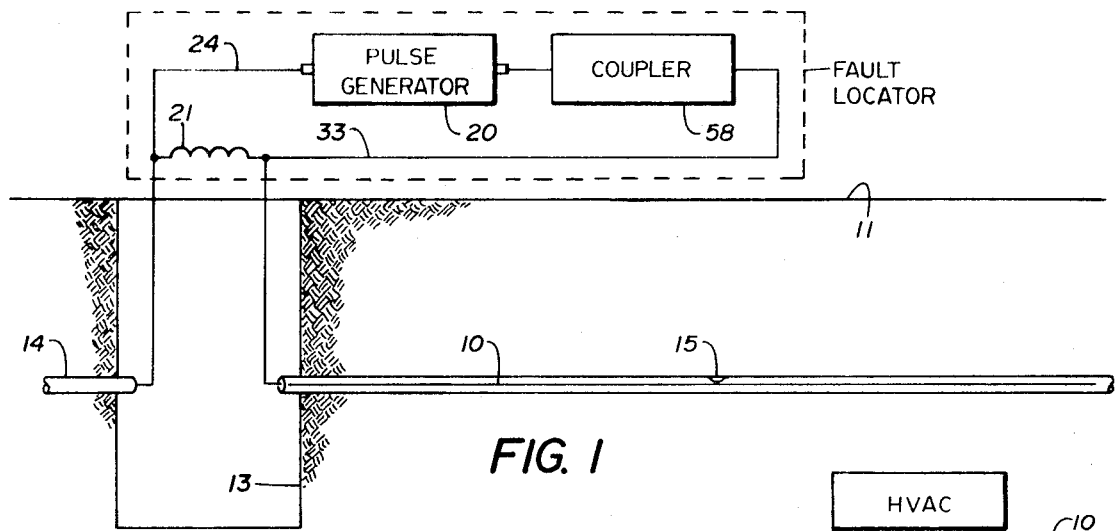
FIG. 1 illustrates a section of a buried power cable in which a fault of unknown location exists.

More particularly, as shown in FIG. 1, a section 10 of a power distribution system is buried beneath the surface 11. The section 10 terminates in a manhole 13. Normally, power is supplied to section 10 by a connection (not shown) from a supply cable 14. A breakdown 15 in the insulation surrounding the central conductor in the cable section 10 has caused power source for line 14 to be disconnected. All that may be known is that a fault occurred somewhere in the isolated portion of the system but at an unknown location. The isolated section may include a plurality of branch lines all terminating in transformers and the like. The difficult task is to identify the exact location of the fault 15.

In accordance with the invention, a pulse is applied to the faulted cable from a pulse generator 20. Operation may be in either of two modes, a long pulse or a short pulse mode. Operation in the long pulse mode is preferred. In such mode, a D.C. step function having an abrupt onset is applied to the cable. A pulse having a rise time on the order of about 50 nanoseconds between 10 percent and 90 percent of the ultimate pulse height has been found satisfactory. The pulse length is longer than the maximum reflection time of the leading edge of the pulse. Pulses of 500 microseconds would permit measurement of faults 25 miles from the point of pulse input. In the short pulse mode, preferably the pulse is about 0.1 to 0.5 microsecond duration with rise and cutoff boundaries of transition time similar to that of the long pulse mode. The level of the pulse voltage roughly corresponds with the rated voltage level of the cable.

To provide the proper setting for application of the pulse, the cable at the location of the fault 15, is ionized by the application of a high transient voltage, limited as to current. Preferably, an inductor 21 is employed to couple the supply 14 to the faulted section 10, thus applying to the section 10 periodic transient voltages at the rated power voltage while limiting the current. The voltage thus applied to the section 10 will periodically ionize the materials at the location of the fault 15 and thereby provide a standardized low impedance mismatch so that a pulse reflected back to the terminal may be detected.

It will be noted that the pulse is applied to the cable 10 by way of an output line 33. The pulse generator 20 has an input line 24. The input line 24 is provided in order to synchronize the application of the pulse with the power current waveform.

Figure 2:
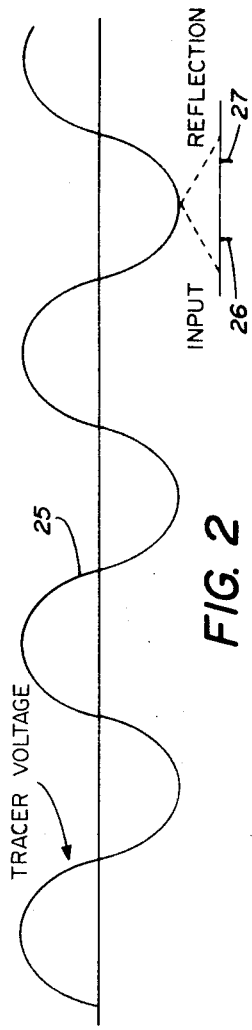
FIG. 2 is a diagram of the power waveform and the TDR pulses.

The preferred mode of operation is shown in FIG. 2 wherein the sine wave 25 represents the voltage applied to cable 10 by way of the choke 21. Preferably in accordance with the present invention, the input pulse onset 26 is applied at about a peak of the ionizing power voltage. As shown in FIG. 2, it is applied at a negative peak. Applicant has found it preferable to use a negative peak because when the polarity of the ionizing voltage is negative relative to ground, the ionization is more effective than during the positive half cycle.

The reflection 27 from the fault 15 then appears on a time scale after a time delay determined by the propagation velocity of the cable 10. The pulse onset 26 and reflection 27 have been shown on an expanded scale in FIG. 2, both occurring within a small fraction of the period of the power frequency represented by sine wave 25. Normally the power frequency will be 60 Hz. The transit times are normally measured in a few microseconds since the propagation velocities for conventional cables are in the range of from 400 to 650 feet per microsecond. Further, in accordance with the invention a display is actuated by pulse onset 26 and the reflected pulse 27 portrayed on a display such as on a cathode ray oscilloscope. At the same time, suitably calibrated counting means is activated to measure the time span between pulse onset 26 and reflection 27. From such time measurement with the propagation velocity of the cables known, the distance from the point of application of the pulse to the fault 15 can be determined.

When the fault has been located, the buried cables may be uncovered for repair. The time expenditure generally involved in locating faults through prior art methods cannot be fully appreciated absent actual experience with the prior art methods and comparison made with the present case. However, generally speaking, the time and cost involved in utilizing the present method is a small fraction compared with that of prior art methods.

In connection with FIG. 3, the construction and operation will be described for cables operating at distribution-class voltages, of the order of 5 kv to 25 kv. A controller 38 is connected to energize a solenoid 36 which when energized, will close a switch 37 into a high voltage, current-limited fused a.c. source 14. Source 14 supplies a current limiter 35 with an ionizing voltage, usually the normal operating voltage for cable 10, or higher, at power frequency. The current limiter 35 may be either a reactor, a constant current transformer or a high reactance transformer. A major component of total current from limiter 35 is the exciting current drawn by transformer primaries permanently attached to the faulted cable. Such inductive load combined with the inductive current limiter 35 makes it necessary to synchronize pulse generator 20 with the ionizing current waveform rather than the voltage waveform. Controller 38 detects the amount of current flow to the faulted cable by means of current transformer 49. When the current reaches a predetermined level, indicating ionization at the point of fault, the controller 38 sends an enable signal to the pulse generator 20. Pulse generator 20 then fires a precision pulse in a monopulse mode into a coupling circuit which includes as a first unit a hybrid coupling network 58. Network 58 is connected to balance network 61 which approximates the characteristic impedance of the faulted cable 10. By this means the incident pulse is prevented from entering a processor 41 connected to network 58 by using known hybrid coupling principles. The incident pulse then passes through further portions of the coupling circuit, including a switch 31, signal coupling network 32, and a fused connector 33 into the cable 10 being ionized at the fault. The precision pulse is superimposed upon the ionizing current waveform from source 14. The fault now presents a standardized low impedance to the pulse which is necessary for reflection back to the source.

All return signals go through hybrid coupling network 58 into a pulse processor 41. The function of pulse processor 41 is to provide protection from line transients and to standardize the return signals. The processor 41 includes a return protection section, a filter section and a pulse shaper section. The return protection section serves to protect the return electronics by means of transient over-voltage supressors. The filter is a high-pass filter to eliminate low-frequency noise. The pulse shaper provides standardized output pulses to be applied through target gate 42 to the stop input of the counter 43. The standardized pulses fed through target gate 42 eliminate counting the connection point to the faulted cable.

More particularly, the target gate responds to the incident pulse and opens a predetermined time thereafter so that early reflections will not be effective to produce a stop pulse. The resultant signal from processing and gating is a stop pulse applied to counter 43 coincident with the reflection from a fault.

A portion of the incident pulse is fed into an attenuator 59 and then into delay line 60. The function of the delay line is to prevent counting the time delay to the connection point of the faulted cable. The resultant signal of this processing is a start pulse for counter 43.

Period counter 43 responds to one of oscillators 45, 46, and 47 which are selectable by a switch 48. The different oscillators enable counter 43 to provide direct distance readings on digital display 44. This arrangement is necessary due to the various propagation velocities encountered with different types of cable insulation. Counter 43 stores the distance reading and then sends a reset pulse to the controller 38 which deenergizes solenoids 36 and 53, thereby releasing switches 37 and 54 to their normal ground position. This completes a cycle which follows the sequence of ground-energize-ionize-pulse-deenergize-ground. This operation may be repeated automatically for verification or controlled manually if desired.

More particularly, as shown in FIG. 2, a cathode ray display 44a has the sweep trigger input connected to respond to the sync pulse from attenuator 59. The other input is connected to the output of the shaper in processor 41. By this means, the return signal can be examined by an operator in order to assist in carrying out the fault location operation.

It is to be understood that when operating on a line the propagation velocity for which is known, one of the oscillators 45–47 may be preselected and the entire operation carried out automatically to produce on the digital display 44 a direct measure of the distance from the input terminal to the fault. Since 1 microsecond represents a pulse travel distance on the order of 500 feet, it is necessary that the counter 43 and the oscillator 47 cooperate to count nanoseconds in order to pinpoint a fault location to within about 2 feet. In instances where the velocity of propagation is not known but length of a cable section to be tested is known, the distance to a fault may be determined by measuring the reflection time from the fault and the reflection time from the cable end.

While separate oscillators 45–47 have been illustrated, it will be understood that a single oscillator may be used. In such case, its output would be applied to a counter of which the oscillator may be a component part. The counter output would then energize a programmable calculator which would compensate, by means of a suitable control criteria or program, for variations in propagation velocity as are experienced in different cables. Such a compensating system would be applicable to operations in either the long pulse or the short pulse modes.

In FIG. 4 a portion of the system of FIG. 3 including the hybrid coupling network 58 has been illustrated. It will be noted that the pulse generator 20 is connected at its output to the primary winding 58a of a transformer whose secondary 58b is connected at one terminal to switch 31. The center tap on winding 58b is connected by way of conductor 58c to the input of processor 41. The bottom terminal of winding 58b is connected by way of the balancing network 61 to ground. It will be noted that the balancing network is a variable impedance which has the value of the characteristic impedance of the cable 10.

The comparison mode network 39 is illustrated as comprising a transformer whose primary winding 39a is connected to one terminal of the input section of switch 31. The secondary winding 39b has a center tap connected to ground. The upper terminal 39c of winding 39b is connected to one terminal of the output section of switch 31 so that it can be connected to cable 10. The second terminal 39d is adapted to be connected to a second cable 10a where it is desired to compare reflections in a cable 10 having a fault therein with reflections from the companion cable 10a in which there are no faults but which has otherwise the same impedances connected thereto as cable 10, such as the A phase and the B phase on a three-phase feeder. Thus, when switch 31 is actuated to include the transformer 39, like signals from reflections traveling back through cables 10 and 10a are canceled whereas the reflections from a fault will then be transmitted back through primary winding 39a and the coupling network 58 to be applied to the processor 41. It is seldom that more than one phase cable is faulted in a given section of line at any one time. Therefore, the comparison method usually can be used in order to eliminate false indications which are reflections from splices and other discontinuities which are common to all three conductors.

The construction and operation of the invention will now be described for a transmission class voltage system. The ionization attachment shown in FIG. 5 is connected to the basic system, as indicated in FIG. 3, for fault location at transmission class voltages. Since transmission cables generally are quite easily disconnected at both ends, the system of FIG. 5 takes advantage of the very low total current requirements for ionization by using a high voltage D.C. power supply. This simplifies the coupling to transmission cable. Controller 38 energizes solenoid 36 that opens switch 37. Controller 38 also energizes solenoid 53 that closes switch 54 to the output of a high D.C. voltage through a current limiter 65. Fused connector 50 connects the high voltage D.C. power supply 51 to the high voltage A.C. source 14. The network also senses the ionizing current flow and sends this information to the controller 38 via ionizing current sense line 67. The sensing of current flow is performed after a delay period which prevents sensing cable charging current. When controller 38 detects ionization, it sends an enable signal to pulse generator 20. Pulse generator 20 then fires a precision pulse in the monopulse mode as previously described. Since output connector 33 is connected to signal coupling network 58 in the high voltage system, the pulse now goes through coupling network 68 and connector 56 into the cable 10 being ionized at the fault. The precision pulse is superimposed upon the output of the high voltage, current limited D.C. source. The fault now presents a standardized low impedance which is a requirement for reflection back to the source. These ionization systems are effective in any common media that may ordinarily fill the insulation void such as air, gas, water, insulating oil or soil.

The foregoing description has made reference to cables on which faults occur. It will be recognized that faults may occur in joints between cable sections, splices, terminators, transformers, switches and other devices subject to insulation failure and connected to the cable. Thus, the term "cable" as used herein shall be taken to include such devices.

By way of example, the location of a fault on a 13,000 volt distribution cable will involve the generation of a negative unipolar pulse of about 500 microseconds duration in the long pulse mode or from 0.1 to 0.4 microsecond duration in the short pulse mode. Such pulse generators are in general well known and may be of the type employed in high power radar systems wherein such a pulse is applied to a klystron in order to produce a pulse modulated radar pulse. In the present case, such output signals are not used. Only the unidirectional pulse employed in conventional radar systems for driving the oscillator is employed. The same type of generator may be used in the long and short pulse modes by suitable adjustment in time constants of the time networks. Preferably the pulse is on the order of 50 kv at 1,000 amperes.

The coupling network 58 may be a 2:1:1 transformer of 50 kv rating and capable of carrying a pulse for about 1 microsecond of 1,000 amperes. The choke 21, FIG. 1, may be of the type generally available in the art with a 95 kv basic insulation level, limiting current therethrough to about 7 amperes.

The signal coupling network 32 may comprise two capacitors of 100 kv rating, totaling 160 picofarads. It has been found preferable to employ two such capacitors, one of which is about ten times the size of the other. As shown in FIG. 4, the signal coupling network 32 includes two capacitors 32a and 32b. A resistor 32c is employed as a pulse voltage divider to provide a ground reference for the high voltage pulse. An inductor 32d is provided to bypass to ground any low frequency noise that appears on the line.

The transient suppressor in processor 41 may be of the well-known type in which a gap in a path leading to ground, located in an evacuated chamber, is cobalt-primed in order to provide for immediate response to transients.

In the embodiment of the invention here described, the filter in the processor 41 was a high-pass filter having about 500 kc lower cutoff. The shaper and processor 41 was an avalanche Schmitt trigger of well-known variety.

Having described the invention in connection with certain specific embodiments thereof, it is to be understood that further modifications may now suggest themselves to those skilled in the art and it is intended to cover such modifications as fall within the scope of the appended claims.

WHat is claimed is:

1. In fault location on an insulated electrical cable, the method which comprises:
  a. applying by way of a series inductor to said cable an alternating voltage at about rated cable voltage to ionize material in the region of failure of said insulation and to thereafter maintain ionization at a reduced current level,
  b. applying along with said reduced current a D.C. pulse having an abrupt onset to said cable at about a peak of said alternating current to produce a reflection from the discontinuity produced by ionization of said material, and
  c. measuring the time interval between application of said D.C. pulse and the return of said reflection as a measure of the distance to said fault.

2. The method of claim 1 wherein said D.C. pulse is of magnitude on the order of the rated cable voltage.

3. The method of claim 1 wherein said alternating voltage is 60 cycles and said D.C. pulse is applied at the peak of a negative half cycle of the resultant current flowing to said cable.

4. The method of claim 1 wherein said D.C. pulse has a rise time of about 50 nanoseconds between 10 percent and 90 percent points.

5. The method of claim 5 wherein said D.C. pulse is of negative polarity and is superimposed on a negative peak of said alternating current in said cable.

6. In fault location on an insulated electrical cable of known propagation velocity, the method which comprises:
  a. applying by way of a series inductor to said cable an alternating voltage at about rated cable voltage to ionize material in the region of failure of said insulation and to thereafter maintain ionization at a reduced current level,
  b. sensing when ionization current flow achieves a predetermined level in successive selected half-cycles in said cable to generate an enable condition,
  c. in response to said enable condition applying a D.C. pulse having an abrupt onset to said cable concurrently with the flow of said ionizing current to produce a reflection from the discontinuity produced by ionization of said material, and
  d. measuring the time interval between application of said D.C. pulse and the return of said reflection to indicate the distance to said fault.

7. The method according to claim 6 wherein said current and said pulse are applied concurrently to said cable and said pulse is applied to a companion cable and wherein reflections from like impedances in both cables are canceled.

8. The method according to claim 6 wherein identical pulses are applied to two like cables only one of which is faulted, and from which like returns are canceled to eliminate the effect of the mismatch at the point of connection of said cable upon said pulse.

9. The method according to claim 6 wherein each said D.C. pulse produces an incident control pulse for use in measuring said interval and wherein a predetermined time delay is applied to said control pulse to compensate for the travel time of said D.C. pulse and the return thereof through the measuring apparatus and connections to said cable.

10. A cable fault locator for a conductor encased in insulation which has failed at a location spaced from an accessible terminal of said conductor which comprises:
   a. means for applying an alternating voltage by way of a series inductor at about the rated cable voltage to said terminal to produce limited flow of alternating current at said voltage to said conductor to ionize material at said location,
   b. means responsive to flow of ionizing current of predetermined level in each successive selected half-cycle for applying an electrical pulse to said terminal concurrently with flow of said ionizing current and at a voltage on the order of rated cable voltage, and
   c. means for measuring the time interval between said pulse and the return of a reflection from the discontinuity produced at said location by the ionization of said material.

11. The cable fault locator of claim 10 wherein said means for applying said pulse to said terminal includes means to produce a negative pulse and to apply the same in the region of a peak of a negative half cycle of said alternating current.

12. A cable fault locator for a conductor encased in insulation which has failed at a location spaced from an accessible terminal of said conductor which comprises:
   a. means for applying by way of a series inductor about the rated cable voltage to said terminal to produce limited flow of power frequency current in said conductor and to ionize material at said location,
   b. means for sensing flow of ionizing current in each successive selected half-cycle to said cable through said terminal to generate an enable condition,
   c. means responsive to said enable condition for applying a unipolar electrical pulse to said terminal in the region of a peak of one half cycle of said current, and
   d. means for measuring the time interval between said pulse and the return of a reflection from the discontinuity produced at said location by the ionization of said material.

13. The combination set forth in claim 12 wherein said pulse is less than 1 microsecond in length with rise time of about 50 nanoseconds between 10 percent and 90 percent points.

14. The combination set forth in claim 12 wherein said pulse is on the order of several hundred microseconds in length and has an onset with a rise time of about 50 nanoseconds between 10 percent and 90 percent points.

15. A cable fault locator for a conductor encased in insulation which has failed at a location spaced from an accessible terminal, said locator which comprises:
   a. a high voltage source of ionizing current for applying alternating current to ionize material in the region of said fault,
   b. a current limiter connected between said source and said terminal for permitting only limited flow of current at said voltage to said terminal,
   c. a pulse generator for producing a unipolar pulse of a voltage at about the rated voltage of said cable,
   d. a coupling circuit connecting said pulse generator to said terminal,
   e. a connection between said current limiter and said pulse generator for supplying an enable condition to said pulse generator in response to flow of ionizing current through said current limiter to apply said unipolar pulse to said cable in the region of the peak of said current for reflection from the mismatch produced at said fault by ionization of said material,
   f. a timing means,
   g. means for connecting an output of said pulse generator to initiate actuation of said timing means in predetermined time relation with the application of said unipolar pulse to said cable, and
   h. means connected between said coupling circuit and said timing means for terminating operation of said timing means to end the timing period in response to receipt of a reflection from said terminal by said coupling circuit.

16. The combination set forth in claim 15 wherein said timing means includes a digital counter and wherein several oscillators each of frequency calibrated with reference to the propagation velocity in a given cable are selectably connectable to said counter for conducting successive tests on different cable types.

17. The combination set forth in claim 15 wherein said timing means includes a digital counter, an oscillator connected to said counter, and a programmable calculator programmed to modify the output of said counter so as to compensate for variations in propagation velocity for different types of cables.

18. A cable fault locator for a conductor encased in insulation which has failed at a location spaced from an accessible terminal of said conductor which comprises:
   a. means for applying a transient voltage at about the rated cable voltage to said terminal to produce limited flow of ionizing current at said voltage to said conductor to ionize material at said location,
   b. means responsive to flow of ionizing current of predetermined level for applying an electrical pulse to said terminal concurrently with flow of said ionizing current and at a voltage on the order of rated cable voltage, and
   c. means for measuring the time interval between said pulse and the return of a reflection from the discontinuity produced at said location by the ionization of said material.

* * * * *